(12) United States Patent
Rubinstein

(10) Patent No.: US 7,737,855 B2
(45) Date of Patent: Jun. 15, 2010

(54) APPARATUS AND SYSTEM FOR STOCK CONTROL

(75) Inventor: Marshal Saul Rubinstein, Suffolk Park (AU)

(73) Assignee: Minibar Solutions Pty Ltd (AU)

( * ) Notice: Subject to any disclaimer, the term of this patent is extended or adjusted under 35 U.S.C. 154(b) by 413 days.

(21) Appl. No.: 11/570,970

(22) PCT Filed: Jun. 22, 2005

(86) PCT No.: PCT/AU2005/000891

§ 371 (c)(1), (2), (4) Date: Dec. 20, 2006

(87) PCT Pub. No.: WO2006/000016

PCT Pub. Date: Jan. 5, 2006

(65) Prior Publication Data
US 2008/0284604 A1 Nov. 20, 2008

(30) Foreign Application Priority Data
Jun. 23, 2004 (AU) .............................. 2004903427

(51) Int. Cl.
*G08B 13/14* (2006.01)
(52) U.S. Cl. .............. 340/572.4; 340/572.1; 340/568.1; 340/545.6; 705/22
(58) Field of Classification Search .............. 340/572.1, 340/572.8, 572.7, 568.1, 545.6, 10.1, 572.4, 340/585; 705/22–24
See application file for complete search history.

(56) References Cited

U.S. PATENT DOCUMENTS

| | | | | |
|---|---|---|---|---|
| 5,798,694 | A * | 8/1998 | Reber et al. | 340/540 |
| 6,677,857 | B2 * | 1/2004 | Bara et al. | 340/572.1 |
| 6,982,640 | B2 * | 1/2006 | Lindsay et al. | 340/540 |
| 7,061,379 | B2 * | 6/2006 | Chen et al. | 340/572.1 |
| 7,406,439 | B2 * | 7/2008 | Bodin et al. | 705/22 |

FOREIGN PATENT DOCUMENTS

WO WO03073201 9/2003

* cited by examiner

*Primary Examiner*—Anh V La
(74) *Attorney, Agent, or Firm*—Schubert & Osterrieder PLLC; Jeffrey S Schubert

(57) ABSTRACT

An apparatus (500) for detecting removal of items from a compartment is disclosed. The apparatus comprises a reader (540) for reading Radio Frequency Identification (RFID) tags attached to items in the compartment and a processor (510), coupled to the reader (540), for identifying items removed from the compartment. Removal of an item from the compartment is detected based on absence of a RFID tag that was previously detected by the reader (540). The RFID tags may be read exclusively when a door of the compartment is closed and the apparatus may further comprise a detector coupled to the processor (510) for detecting open/close status of the door. Removal of an item is preferably confirmed only when a RFID tag attached to an item has been absent from the compartment for longer than a defined time period.

27 Claims, 5 Drawing Sheets

APPARATUS AND SYSTEM FOR STOCK CONTROL

TECHNICAL FIELD

The present invention relates to mini-bars.

BACKGROUND ART

Mini-bars are commonly found in rooms of hospitality establishments throughout the world and are usually stocked with various items such as chocolates, soft drinks, and alcoholic drinks. However, management of mini-bars represents a problematic challenge to hospitality operators and frequently requires a dedicated department in the establishment. Stocking of mini-bars is labour intensive. Up-to-date information relating to consumption of items from a mini-bar by a guest is generally not available at the time of check-out of the guest. Such consumption frequently goes unrecorded, resulting in a high percentage of lost sales. Although problematic to hospitality operators and even unprofitable in certain instances, mini-bars are a necessary amenity that guests expect to find in a hotel room.

Various attempts to solve the foregoing problem have been devised. For example, a fridge with individual compartments for items and micro-switches located in the compartments to detect removal of items from the compartments has been proposed. This disadvantageously necessitates replacement of an existing mini-bar, thus requiring capital expense, room furniture modification, time delays and general inconvenience. Moreover, the micro-switches occupy valuable fridge space, thus limiting overall storage capacity. Air circulation and cooling efficiency are also negatively impacted by the geometry of the compartments and the micro-switches. The micro-switches may also be tampered with, for example, guests may jam pieces of paper in the micro-switch mechanisms in an attempt to remove an item without detection thereof.

U.S. Pat. No. 4,891,755, entitled "System for detecting removal of items from a hotel mini bar and for the automatic charging of the bill of the gas for items removed from the minibar", issued to Amram Asher on Jan. 2, 1990. The system described in this specification is based on weight measurements which are used to identify items removed by a guest. Disadvantageously, accurate weight sensors such as strain gauges are necessary.

A need exists to provide apparatuses and systems for stock control in mini-bars that overcome or at least ameliorate deficiencies in existing arrangements.

DISCLOSURE OF THE INVENTION

An aspect of the present invention provides an apparatus for detecting removal of items from a compartment, which comprises a reader for reading Radio Frequency Identification (RFID) tags attached to items in the compartment and a processor, coupled to the reader, for identifying items removed from the compartment. Removal of an item from the compartment is detected based on absence of a RFID tag that was previously detected by the reader.

The RFID tags may be read exclusively when a door of the compartment is closed and the apparatus may further comprise a detector coupled to the processor for detecting open/close status of the door. Removal of an item is preferably confirmed only when a RFID tag attached to an item has been absent from the compartment for longer than a defined time period.

Another aspect of the present invention provides an apparatus for detecting removal of items from a mini-bar. The apparatus comprises a radio frequency detector for detecting items in the mini-bar, a communications interface for transmitting and receiving data, a memory unit for storing data and instructions to be performed by a processing unit and a processing unit coupled to the reader, the communications interface and the memory unit. The processing unit is programmed to receive data from the radio frequency detector, identify items removed from the compartment based on the data and report removed items via the communications interface.

Another aspect of the present invention provides an apparatus comprising a compartment for storing items, a reader for reading Radio Frequency Identification (RFID) tags attached to items in the compartment and a processor, coupled to the reader, for identifying items removed from the compartment. Removal of an item from the compartment is identified based on absence of a RFID tag that was previously detected by the reader.

The apparatus may further comprise a communications interface and/or a display for reporting items removed from the compartment to a host computer. Removal of an identified item is preferably only reported when a RFID tag attached to the item has been absent from the compartment for longer than a defined time period.

Another aspect of the present invention provides a system for managing stock in a plurality of hotel mini-bars. The system comprises a central computer server and a plurality of Radio Frequency Identification (RFID) units coupled to the central computer server. Each RFID unit is associated with one of the mini-bars and detects and reports items removed from the associated mini-bar to the central computer server.

The central computer server may be coupled to a hotel Property Management System (PMS) and the cost of items removed from the mini-bars may be automatically debited to an associated account by the PMS. The plurality of Radio Frequency Identification (RFID) units may each comprise a reader for reading Radio Frequency Identification (RFID) tags attached to items in an associated mini-bar and a processor, coupled to the reader, for identifying items removed from the mini-bar. Removal of an item from a mini-bar is detected based on absence of a RFID tag that was previously detected by the reader.

Each of the plurality of Radio Frequency Identification (RFID) units may comprise a radio frequency detector for detecting items in an associated mini-bar, a communications interface for transmitting and receiving data, a memory unit for storing data and instructions to be performed by a processing unit and a processing unit coupled to the reader, the communications interface and the memory unit. The processing unit is programmed to receive data from said radio frequency detector, identify items removed from the mini-bar based on the data and report the removed items via the communications interface.

The system may further comprise a controller for controlling operation of at least one of the mini-bars remotely from the central computer server.

BRIEF DESCRIPTION OF THE DRAWINGS

A small number of embodiments are described hereinafter, by way of example only, with reference to the accompanying drawings in which.

MODES FOR CARRYING OUT THE INVENTIONS

Figure 1:
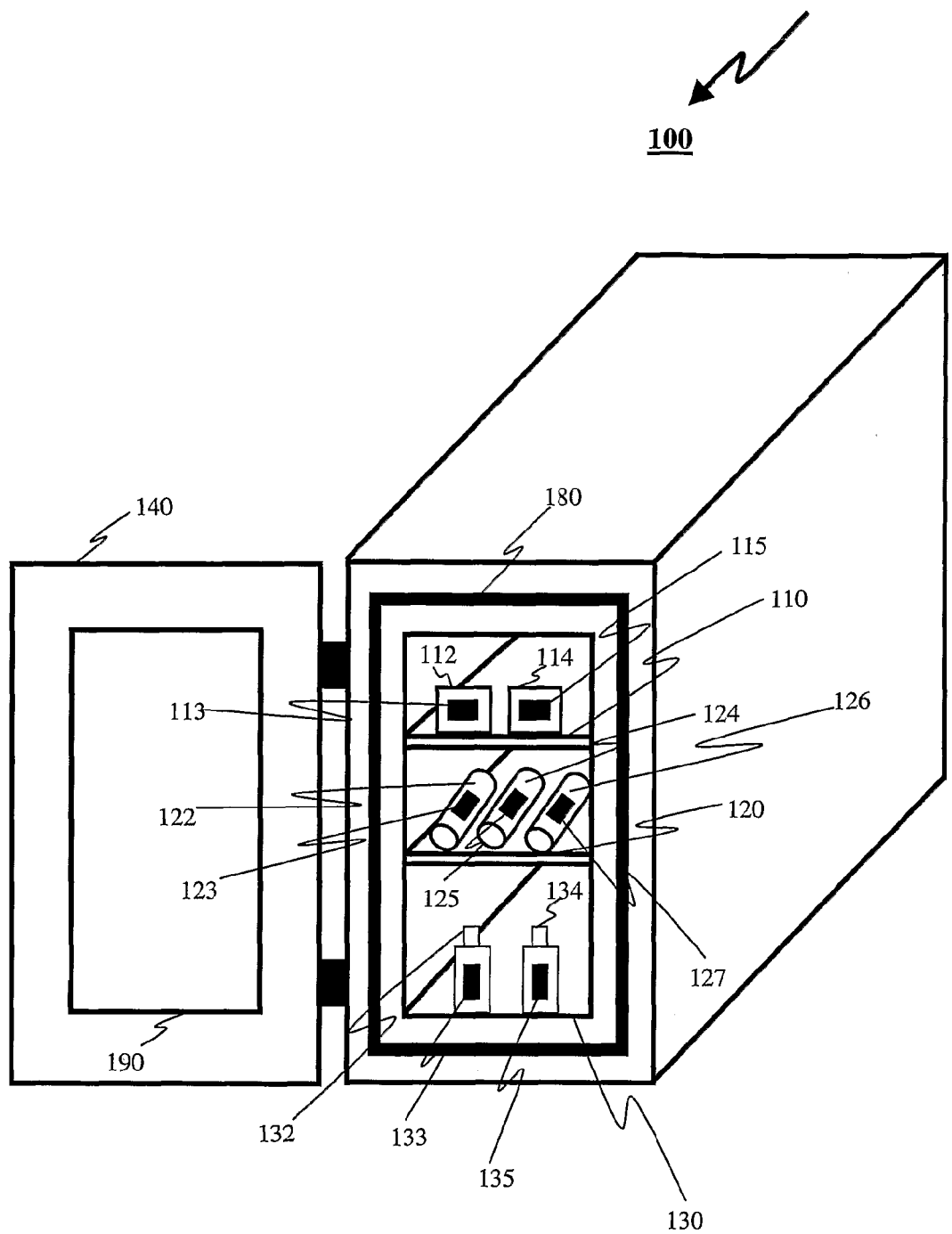
FIG. 1 is a perspective view of a mini-bar according to an embodiment of the present invention.

FIG. 1 shows a mini-bar 100 according to an embodiment of the present invention. The mini-bar 100 is a compartment that comprises sides, a top, a base 130, internal shelves 110 and 120 and a door 140 that is hingedly attached to the mini-bar 100. The mini-bar 100 is stocked with items 112 and 114 on shelf 110, items 122, 124 and 126 on shelf 120 and items 132 and 134 on the base 130. A Radio Frequency Identification (RFID) tag for identification of a respective item or item type by an RFID reader is attached to each of the items. Items 112 and 114 have RFID tags 113 and 115, respectively. Items 122, 124 and 126 have RFID tags 123, 125 and 127, respectively. Items 132 and 134 have RFID tags 133 and 135, respectively.

An RFID antenna 180 is disposed around the perimeter of the opening of the mini-bar 100 in a plane that is parallel to the door 140 of the mini-bar 100 when the door 140 is closed and is of substantially square or rectangular shape. An RFID antenna 190 may alternatively, or in addition to the RFID antenna 180, be disposed within or on the surface of the door 140 of the mini-bar 100. The RFID antennae 180 and 190 are depicted in FIG. 1 as loop antennae but may alternately comprise patch antennae or any other type of antennae suitable for operation in a particular frequency range and/or to obtain a desired RFID read and/or read/write coverage pattern.

Figure 2:
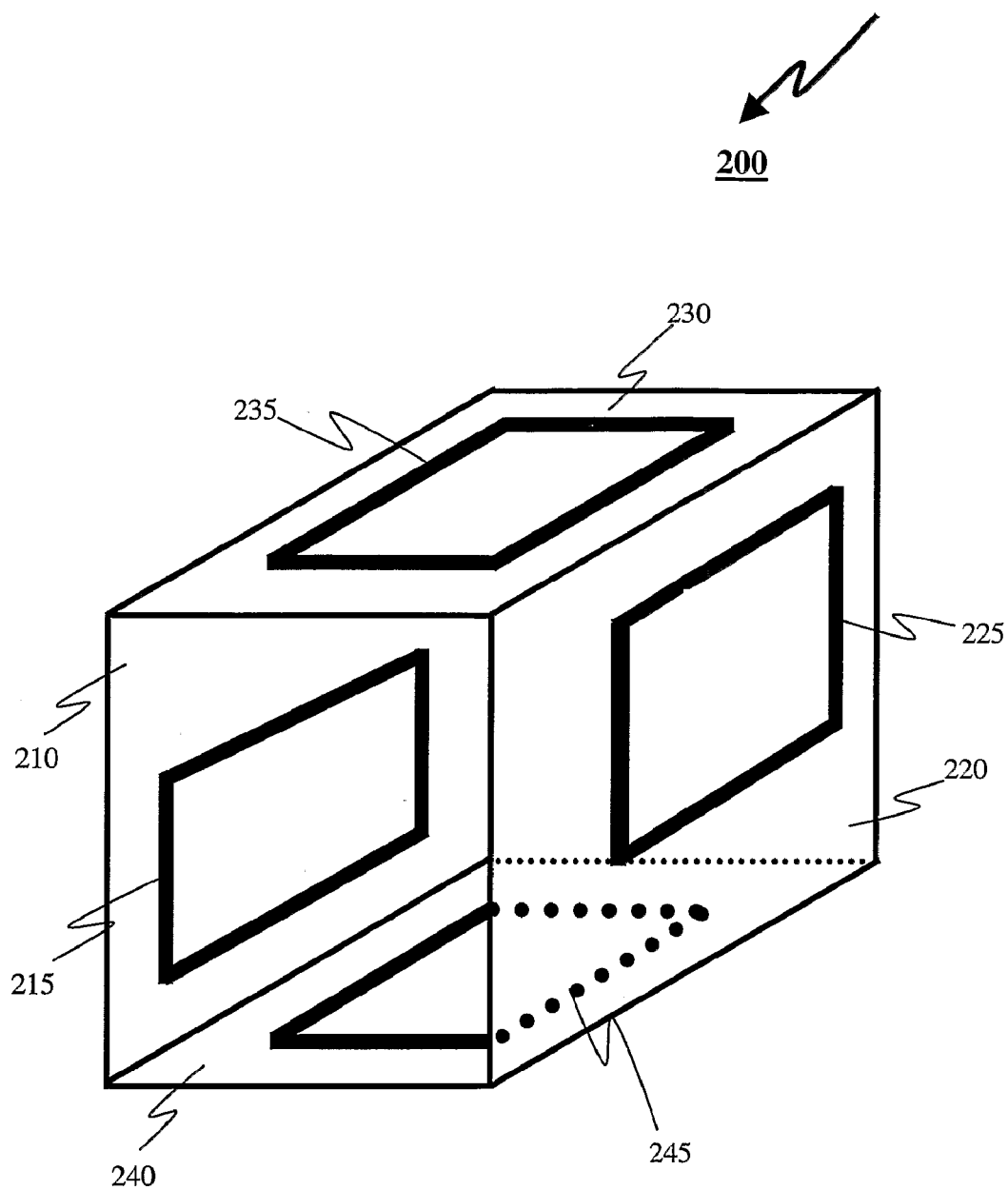
FIG. 2 is a perspective view of a mini-bar according to another embodiment of the present invention.

FIG. 2 shows a mini-bar 200 according to another embodiment of the present invention. The mini-bar 200 is substantially similar to the mini-bar 100 in FIG. 1 but has RFID antennae 215, 225, 235 and 245 disposed in or on the panels 210, 220, 230 and 240 of the mini-bar 200, respectively. Each of the RFID antennae 215, 225, 235 and 245 is disposed in a plane substantially parallel to a respective panel 210, 220, 230 and 240. The mini-bar 200 is shown without a door, shelves and stock items. The RFID antenna 215, 225, 235 and 245 are typically, but not necessarily, of substantially rectangular geometrical shape, as shown in FIG. 2. Other geometrical shapes of RFID antennae may be practiced, for example, round, oval, etc. The RFID antennae are of appropriate dimensions and/or location to individually or collectively provide desired RFID read/write coverage in the compartment formed by the panels 210, 220, 230 and 240 of the mini-bar 200. Additional RFID antennae (not shown) may be practiced to improve the RFID coverage. For example, a panel of the mini-bar 200 may comprise more than one RFID antenna.

Figure 3:
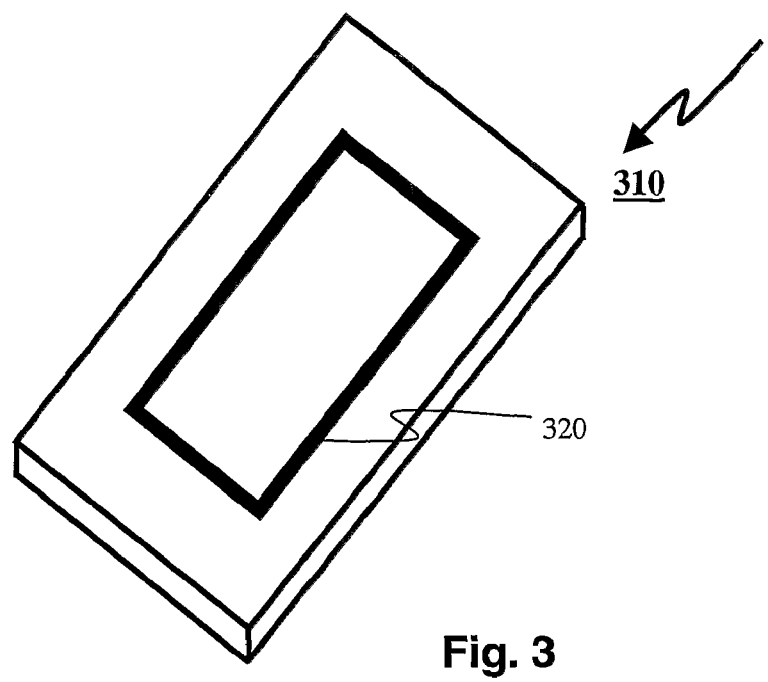
FIG. 3 is a perspective view of a panel or shelf for use in a mini-bar according to an embodiment of the present invention.

FIG. 3 shows a panel or a shelf 310 for use in a mini-bar according to an embodiment of the present invention. An RFID antenna 320 is disposed in or on the panel or shelf 310. The RFID antenna 320 may be integrated within the panel or shelf 310 (e.g., using plastic molding) or attached to an external surface of the panel or shelf 310 (e.g., using adhesives or other attaching means).

Figure 4:
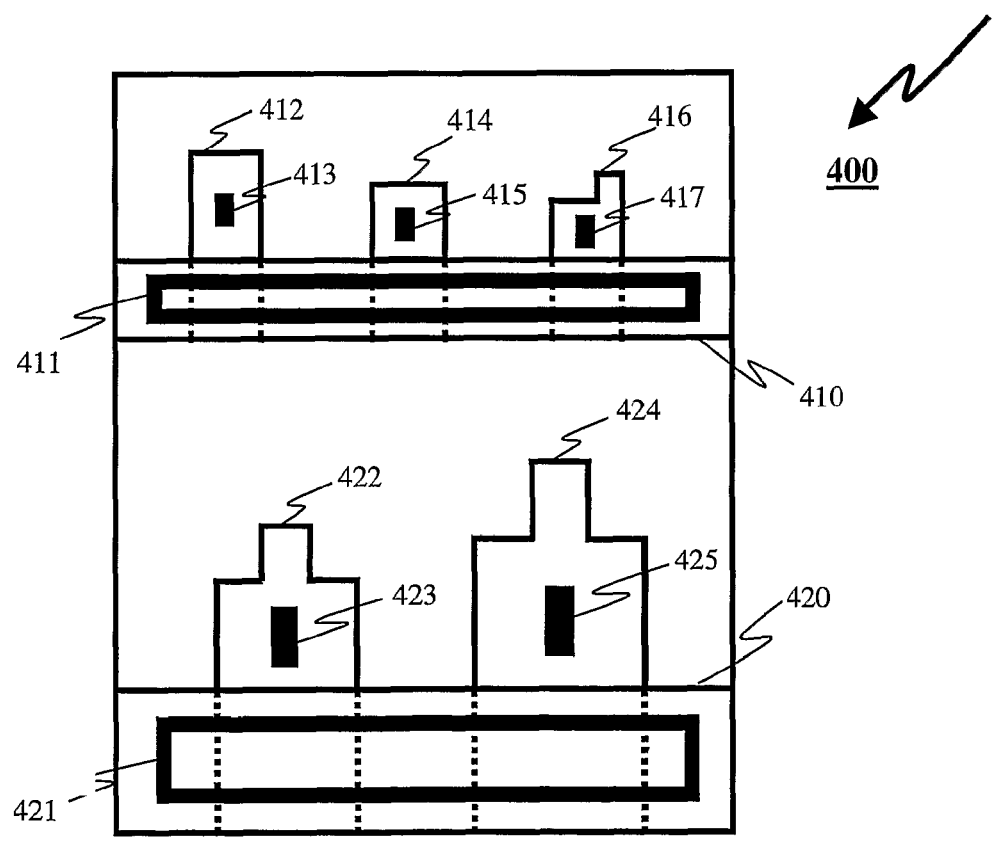
FIG. 4 is a inside view of a door for a mini-bar according to an embodiment of the present invention.

FIG. 4 shows an embodiment of a door 400 for a mini-bar such as one of the mini-bars 100 and 200 shown in FIGS. 1 and 2, respectively. The door 400 comprises two shelves 410 and 420. Items 412, 414 and 416 are supported by the shelf 410 and the items 422 and 424 are supported by the shelf 420. RFID tags 413, 415 and 417 are attached to items 412, 414 and 416, respectively. RFID tags 423 and 425 are attached to items 422 and 424, respectively.

RFID antennae 411 and 421 are disposed or located in or on panels of the shelves 410 and 420, respectively. The RFID antennae 411 and 421 are typically, but not necessarily, of substantially rectangular geometrical shape and are of appropriate dimensions to provide suitable RFID coverage to detect tagged items located in or on the shelves 410 and 420, respectively. Alternative antenna configurations and numbers of antennae may be practiced to provide desirable RFID detection coverage. For example, a shelf of the mini-bar door 400 may comprise more than one RFID antenna or one antenna may be used for more than one shelf. The RFID antennae 411 and 421 are depicted mounted in or on vertical panels of the shelves 410 and 420, respectively, in FIG. 4. However, RFID antennae may alternatively or additionally be mounted in or on the horizontal panels of the shelves 410 and 420, respectively.

The RFID antennae may be located in or on the horizontal and/or vertical panels of the shelves to enable detection of RFID tags located on the underside, sides, or tops of items located on the shelves. As metal surfaces screen radio frequency signals, it is preferable to detect RFID tags placed on the underside of metallic items (e.g., soft drink cans) by antennae located in or on the horizontal panels of the shelves that the items rest on. The antennae can be fixed to internal surfaces of an existing fridge or be integrated into the actual fridge components, for example, the plastic moulded shelves.

In other embodiments, one or more RFID antennae are disposed outside of, but in substantially close proximity to, the opening of a mini-bar. In one particular embodiment, for example, a RFID antenna is disposed around the opening of a unit, such as a wooden cabinet, that houses the mini-bar.

Figure 5:
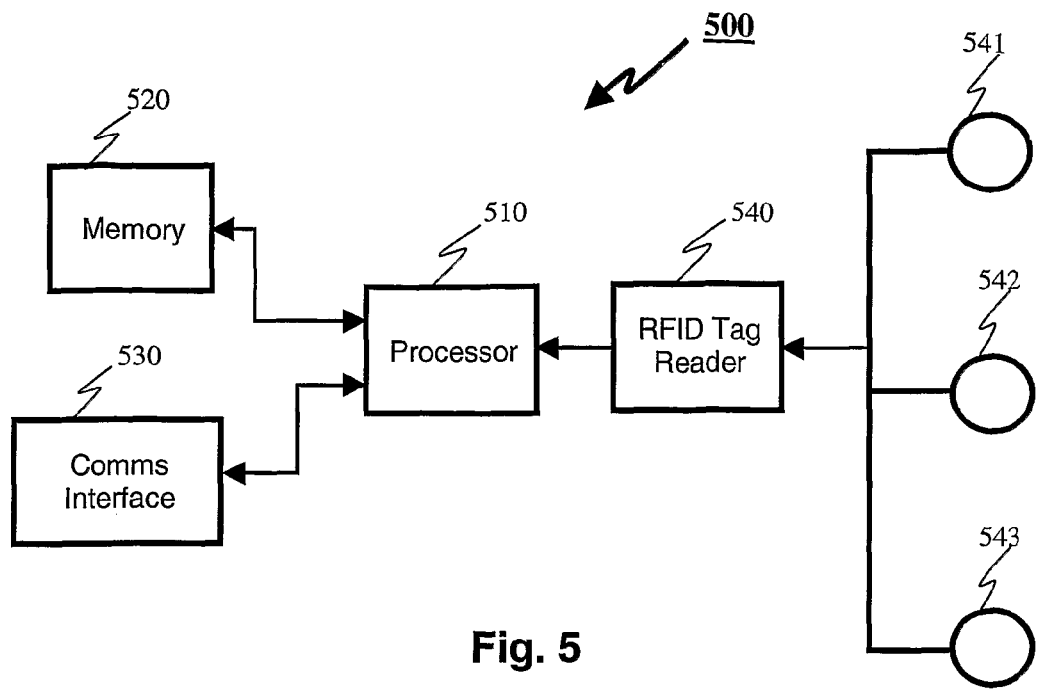
FIG. 5 is a block diagram of an apparatus for detecting removal of items from a mini-bar in accordance with an embodiment of the present invention.

FIG. 5 shows a block diagram of an apparatus 500 for detecting removal of items from a mini-bar. The apparatus 500 comprises a processor 510, a memory 520, a communications interface 530, a RFID tag reader 540 and RFID antennae 541, 542 and 543. Although FIG. 5 shows 3 RFID antennae, other numbers of RFID antennae may also be practiced. Although FIG. 5 shows only 1 RFID reader, more than 1 RFID reader may also be practiced. Recent developments include complete compact system-on-chip (SOC) RFID reader modules. Thus, each separate coverage zone may be covered by a separate module consisting of an integrated RFID reader and antennae. Several such units can communicate with the processor 510 through either a wired or wireless link.

The apparatus 500 may optionally further comprise a display (not shown) under control of the processor 510 for reporting information relating to the stock in a mini-bar. For example, the display may indicate to a hotel guest that an item has been removed from the mini-bar. The display may indicate the cost of the removed item that will be debited to the guest's account. In an alternative embodiment, the television set in a guest room is interfaced to the apparatus 500 via the communications interface 530 for displaying mini-bar stock-related information thereon. The processor 510 may comprise any general purpose microprocessor as typically used in embedded computing applications and may run an embedded operating system such as embedded Linux or Microsoft Windows CE.NET. The display may comprise a liquid crystal display (LCD), light emitting diode (LED) display, or any other display type known in the art.

Operation of the apparatus 500 is performed under the control of the processor 510, which executes a software application program stored in the memory 520. The apparatus 500 may be configured to determine the stock inventory of a mini-bar periodically (e.g., once every minute). Further, the apparatus 500 may be configured to determine the stock inventory of a mini-bar only when the door of the mini-bar is closed, thus avoiding reading items located outside the mini-bar. A sensor may be used to determine the open/closed status of the door. One such sensor may comprise a micro-switch for detecting closure of the door. Another such sensor may comprise a light sensor for detecting the mini-bar's internal light. Yet another sensor may detect power provided to the internal light bulb when the door is open and the light is on. Such a sensor may be inserted into the electrical socket of the mini-bar internal light and provide an alternative socket for the light bulb to fit into. The processor 510 waits for a predetermined time period (e.g., 30 seconds) before performing a final check to determine whether the item identified as having been removed from the mini-bar has been replaced. If the item has not been replaced, a sale is recorded. The sale may be reported on the display, by way of an audible beep or announcement, and/or via the communications interface 530 to a host computer system.

Another embodiment provides an audio device under the control of the processor 510, which enables audible indications of removal of an item from the mini-bar, expiry of the time allowed to replace the item without a charge being raised and other events that may need to be communicated. The audio device may comprise a loudspeaker for facilitating voice announcements relating to details of items removed, the cost to be billed to a guest account, etc.

Another embodiment provides an input/output control unit under the control of the processor 510, which enables relays or other switching means to control various appliances such as a lock on the mini-bar, a lock on a guest safe and room lighting, heating, ventilation and air conditioning systems. These functions may be accessed remotely via the communications interface 530. The processor 510 may further monitor and report mini-bar temperature and allow automatic adjustment of the thermostat to allow for energy savings and quieter operation of the mini-bar when the guest is sleeping or when the room is unoccupied for long periods of time.

Figure 6:
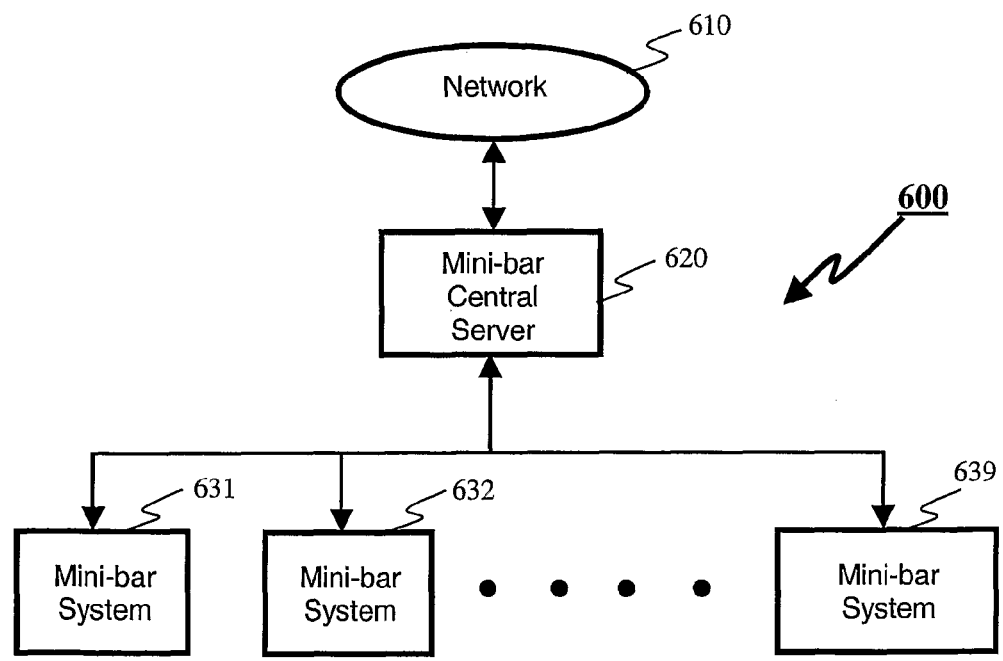
FIG. 6 is a block diagram of a system for managing stock in multiple hotel mini-bars.

FIG. 6 shows a block diagram of a system 600 for managing stock in multiple hotel mini-bars. The system 600 comprises a mini-bar central server 620 coupled to multiple mini-bar systems 631, 632, . . . 639. Each of the mini-bar systems 631, 632, . . . 639 may correspond to the apparatus 500 as shown in FIG. 5. The mini-bar systems 631, 632, . . . 639 are coupled to the mini-bar central server 620 via a wired network (e.g., CAT5, CAT6, Homeplug PNA, CATV wiring interface, twisted pair, mains signalling), a wireless network (e.g., 802.11, wireless GPRS) or any other networking medium, including the Internet and a Virtual Private Network (VPN).

The mini-bar central server 620 comprises a computer system such as a personal computer (PC), which may be coupled to a host system such a hotel Property Management System (PMS) (not shown) via a network 610, such as a cabled or wireless local area network (LAN) or any other available and/or suitable coupling means. This facilitates data exchange between computer software applications executed by the mini-bar central server 620 and the hotel PMS, thus enabling general mini-bar stock control, including debiting of the cost of items removed from any of the mini-bars from an associated room or guest account.

The mini-bar central server 620 can produce refill and tamper reports for mini-bar attendants, thus optimising labour requirements and increasing efficiency. Electronic Data Interchange (EDI) messages may also be automatically generated and sent to suppliers of mini-bar items for maintenance of stock levels.

The mini-bar central server 620 may comprise an integrated web server, or be connected to an external web server via XML web services or any other suitable means of data integration with the external web server. The web application running on the web server may allow authorised users to view various levels of information depending upon a password access level. The information may, for example, relate to sales data, inventory data, expiry dates of items, mini-bar maintenance data and operational status of mini-bars. The web application running on the web server may comprise management tools to assist in management of the mini-bar operation, including stock levels, automatic ordering of stock required from suppliers via email messages, EDI messages or any other means of communication.

The mini-bar central server 620 may also comprise an integrated SMS gateway, or may be connected to an external SMS gateway. Using the SMS gateway, messages may be sent to mini-bar operators and management regarding malfunctions, stock control issues and any other messages that may be of interest. Messages may also be transmitted via email, SMS or to wireless devices as determined by the software application running on the mini-bar central server 620 or a software application running on another computer system connected to the Mini-bar Central Server 620, via a wired or wireless network, such as an Internet connection.

The mini-bar central server 620 may be connected to a wireless network such as GPRS or 802.11 to enable access to the mini-bar system via wireless handheld devices. The software application running on the mini-bar central server 620 enables mini-bar staff to access mini-bar information and enter information into the system via such wireless handheld devices. This may advantageously result in time efficiencies, for example, enabling stock and guest charge adjustments to be made while mini-bar staff are in a guest room refilling a mini-bar.

The mini-bar central server 620 software application may be connected to an external database server via a wired or wireless private network, the Internet or a Virtual Private Network (VPN). The database may contain information relevant to several hotel properties with the mini-bar system 600 installed. Such information typically relates to items stocked in the mini-bars such as EAN Barcode numbers, descriptions, vendor details, etc. Database access to such information results in significant time efficiencies and reduces clerical errors. Inventory, sales, maintenance and other management data may also be uploaded to the central database server, thus assisting in centralised management of the mini-bar operations for several hotel properties with mini-bar system 600 installations.

Advantageously, embodiments of the present invention enable detection of the presence of all the items within the mini-bars, thus facilitating automated stocktaking, including expiry date information, in near real-time across a plurality of mini-bars and/or mini-bar system 600 installations.

The physical location of the mini-bar central server 620 could be within the same building as where the mini-bar systems 631, 632, . . . 639 are located or in a remote location via a wired or wireless private network, the Internet or a Virtual Private Network (VPN) connection.

Any number of mini-bar central servers may be practiced. Certain mini-bar central servers may be deployed to perform different processing or communication tasks. Moreover, multiple mini-bar central servers may be practiced to provide load-balancing and/or redundancy.

Figure 7:
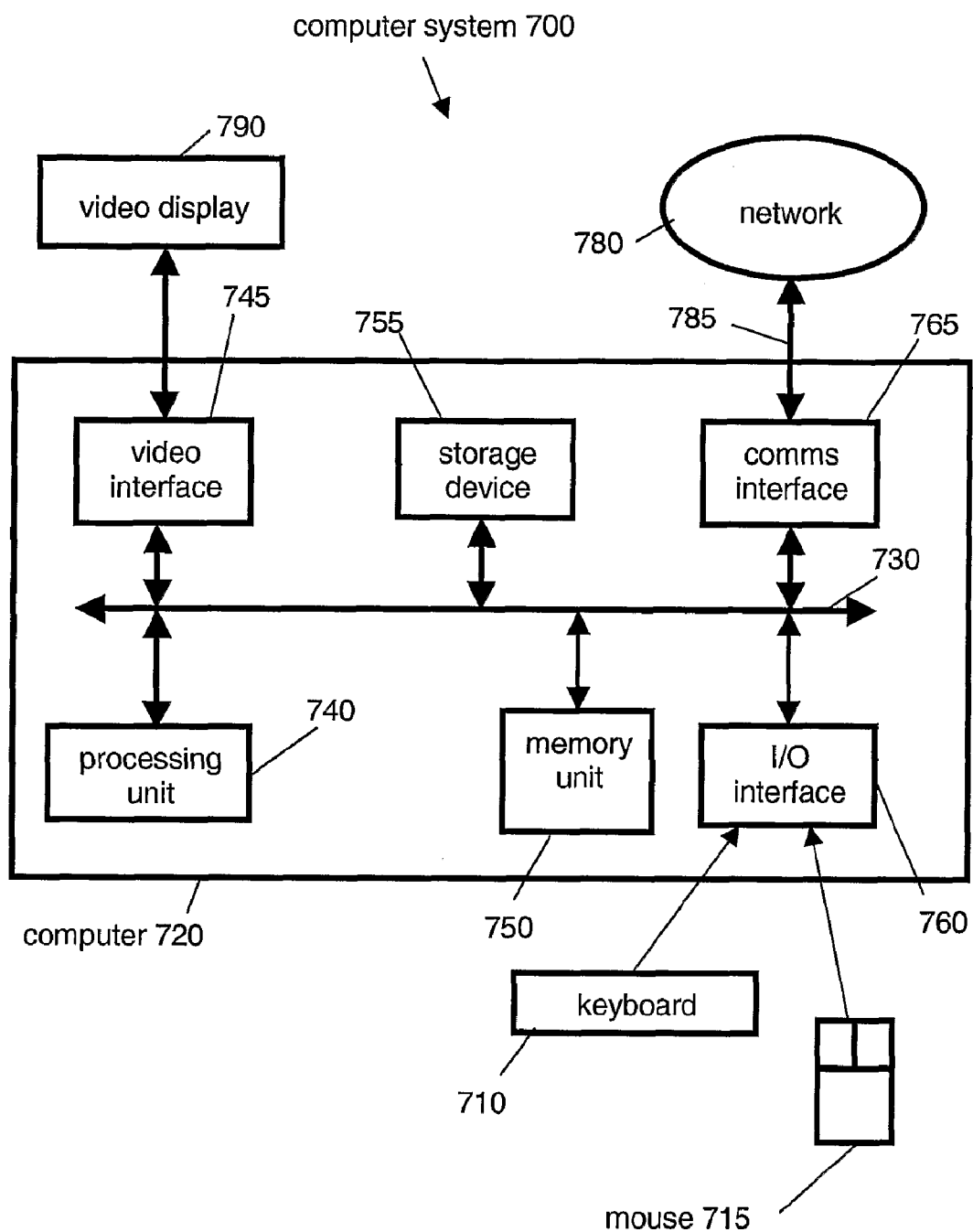
FIG. 7 is a schematic representation of a computer system that can be used to practice embodiments of the present invention.

FIG. 7 is a schematic representation of a computer system 700 that can be used to practice the mini-bar central server 620. Specifically, the computer system 700 is provided for executing computer software for managing stock relating to multiple mini-bars. The computer software executes under an operating system such as MS Windows XP™ or Linux™ installed on the computer system 700.

The computer software involves a set of programmed logic instructions that may be executed by the computer system 700 for instructing the computer system 700 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code means, that perform particular steps of the methods described hereinbefore.

The components of the computer system 700 comprise a computer 720, input devices 710, 715 and a video display 790. The computer 720 comprises a processing unit 740, a memory unit 750, input/output (I/O) interface 760, communications interface 765, a video interface 745, and a storage device 755. The computer 720 may comprise more than one of any of the foregoing units, interfaces, and devices.

The processing unit 740 may comprise one or more processors that execute the operating system and the computer software executing under the operating system. The memory unit 750 may comprise random access memory (RAM), read-only memory (ROM), flash memory and/or any other type of memory known in the art for use under direction of the processing unit 740.

The video interface 745 is connected to the video display 790 and provides video signals for display on the video display 790. User input to operate the computer 720 is provided via the input devices 710 and 715, comprising a keyboard and a mouse, respectively. The storage device 755 may comprise a disk drive or any other suitable non-volatile storage medium.

Each of the components of the computer 720 is connected to a bus 730 that comprises data, address, and control buses, to allow the components to communicate with each other via the bus 730.

The computer system 700 may be connected to multiple apparatuses for detecting removal of items from associated mini-bars via the communications interface 765 using a communication channel 785 and a network 780. The network 780 typically, but not necessarily, comprises a private hotel network such as CAT5, CAT6, Homeplug PNA, CATV wiring interface, twisted pair, mains signalling, 802.11 wireless network, or wireless GPRS. Remote connection may also be possible via the Internet and/or a Virtual Private Network (VPN).

The computer system 700 may also be connected to other computer systems such as a hotel PMS, either via the communications interface 765 or another similar communications interface (not shown). Such connection is typically, but not necessarily, via a private hotel network. Remote connection may also be possible via the Internet and/or a Virtual Private Network (VPN).

The computer software program may be provided as a computer program product, and recorded on a portable storage medium. In this case, the computer software program is accessible by the computer system 700 from the storage device 755. Alternatively, the computer software may be accessible directly from the network 780 by the computer 720. All or part of the computer software program may be hosted on a remote computer system and may be executed on the remote computer system as a web application for access by the computer 720. In any case, a user can interact with the computer system 700 using the keyboard 710 and mouse 715 to operate the programmed computer software executing on the computer 720.

The computer system 700 has been described for illustrative purposes. Accordingly, the foregoing description relates to an example of a particular type of computer system suitable for practising the methods and computer program products described hereinbefore. Other configurations or types of computer systems can be equally well used to practise the methods and computer program products described hereinbefore, as would be readily understood by persons skilled in the art.

Embodiments of the present invention use Radio Frequency Identification (RFID) readers and tags to monitor stock in, and detect items removed from, a mini-bar. ISO 15693 and ISO 14443 are evolving international standards administered by the International Standards Organisation (ISO), which RFID readers and tags may be required to comply with in certain regions or jurisdictions. ISO 15693, in particular, is an evolving global open standard for 'vicinity' RFID or 'smartlabel' applications in the 13.56 MHz frequency range. Philips Semiconductors and Texas Instruments produce the 'ICODE' and 'Tag-it' range of RFID products, respectively, which conform to ISO 15693, and may be used to practice embodiments of the present invention. The 'ICODE' product has a reading range of approximately 1 m and includes anti-collision measures that enable multiple RFID tags to be read substantially simultaneously. It should be noted, however, that RFID devices that operate in other frequency bands and that meet other standards or no standards at all may also be used to practice embodiments of the present invention.

The RFID tags attached to each item may be read-only or read/write. Read-only tags typically provide a substantially unique identification number when read that can be associated with an individual item or item-type by a software program executed by an apparatus for detecting removal of items from a mini-bar or a central server. Read/write tags may be encoded with various information such as an expiry date for an item. This enables automatic monitoring of expiry dates relating to stock items and alerting of mini-bar attendants when stock items require replacing. The system can also be configured to notify mini-bar attendants of items that are removed from the mini-bar but are returned within a predetermined time period. This enables checking of such items for tampering (e.g., partial consumption and/or partial replacement of contents). Information relating to tampering may further be recorded on a RFID tag attached to an associated item.

When an item has been removed from a mini-bar for a sufficiently long time duration to be recorded as a sale, the unique identification number of the RFID tag associated with the item is recorded as having been sold. If the item is subsequently returned to within the operating range of the RFID reader, the item will be recorded as consumed (or partially consumed) but will not be added back into the mini-bar's inventory. Items returned to the mini-bar may be included in reports to mini-bar staff for replacement. When an item removed from a mini-bar is replaced after a defined time period has expired and the item has not been opened, the inventory may be manually adjusted and the unique identification number associated with the item's RFID tag may be added again to the mini-bar's inventory.

In certain embodiments, the mini-bar reader may be configured to write information in an RFID tag's memory. This is particularly useful for items that have been taken out of a mini-bar long enough to have been charged, but have subsequently been replaced. Certain commercially available RFID tags provide a writable bit in tag memory that can be set to a one or a zero. Such is commonly used in EAS tags attached to merchandise in retail stores. Upon being sold, the tag is deactivated at a checkout station by changing the state of the writable bit. The default state of the bit may be set to 1, for example, to indicate that the item attached to the tag has not been purchased, and cleared at the checkout upon sale of the item. Embodiments of the present invention may use this technique to change a bit on the RFID tag to indicate that an item has been charged to a guest account. Mini-bar attendants may use a simplified RFID unit that can detect the status of this bit. Upon inspection of the item, and if satisfied that the item is unused and has not been tampered with, the attendant may use the simplified RFID unit to change the status of the bit back to "unsold". The simplified RFID unit may thus comprise a transmitter circuit that creates a write field for resetting the "sold" status bit back to "unsold".

Upon replacement of an item in the mini-bar, information relating to the item is communicated to the central mini-bar server, which subsequently produces a report. A mini-bar attendant can thus easily and quickly locate the replaced item in the mini-bar using the tag number and description of the item from the report.

As would be understood by persons skilled in the art, the number, shape, dimensions and location of the RFID antennae may vary according to the internal geometry of a mini-bar the RFID antennae are fitted to and the materials used in the manufacture of the mini-bar. Multiple antennae may be connected to a single RFID tag reader. Combinations of RFID antenna locations shown in any of the embodiments of FIGS. 1 to 4 and/or any other combinations may be used to achieve improved RFID read or read/write coverage based on the internal geometry of a particular mini-bar. The RFID antennae may be designed and/or installed in a manner that minimises communication with RFID tags located outside a mini-bar.

The illustrations in the accompanying figures generally show loop antennae, such as those used with low frequency RFID devices that operate in the 125 KHz range. Loop antennae typically comprise multiple turns of an electrical conductor (e.g., copper wire) with take-off leads for connection to an RFID tag reader. However, other types of antennae may be practiced in accordance with the operating frequency range of the particular RFID devices used. For example, an RFID antenna may comprise a printed circuit board with tracks laid out in a specific pattern to maximise RF transmission and/or reception at a particular frequency that the RFID devices operate at. At higher operating frequencies, YAGI and patch antennae are typically practiced. A YAGI antenna comprises a linear arrangement of elements, whereas a patch antenna is a flat square or rectangular shaped antenna.

Certain embodiments use passive tags on the items. Benefits of passive tags include lower cost and the existence of anti-collision protocols that allow many passive tags to be read simultaneously within the field of a reader. Passive tags or transponders obtain energy to operate from a reader, via one or more energising field antennae. Provision of an energising field somewhat complicates the design of the reader or antennae and two design options are generally possible. The first option, known as a bistatic reader, utilises two antennae for a particular coverage area, one to receive the signal and the other provide the energising field. The second option, known as a monostatic reader, uses the same antenna to receive the signal and provide an energising field for a particular coverage area.

Certain embodiments use a monostatic type of reader, with one antenna to cover a particular coverage area within a mini-bar. The benefits of this arrangement include a more compact antenna arrangement and more uniform coverage at ranges close to the antenna. Several antennae may be used to provide a coverage pattern within a mini-bar to ensure that all items are within read and/or read/write coverage of the reader. A switching circuit may be employed to switch the various antennae synchronously so that the reader progressively reads tags located in various sections of the mini-bar. Alternatively, several antennae may be electrically connected to provide simultaneous coverage of all areas within the mini-bar.

Other embodiments use bistatic RFID readers that employ two separate antennae to cover a particular coverage area within a mini-bar. This arrangement simplifies the reader design since the two antennae may be physically arranged in such a way as to keep the energising signal away from the sensitive receiver antenna which is required to pick up an RFID tag signal that may be in the order of magnitude of 1 million times weaker than the energising signal at the same frequency and at the same instant in time.

Certain embodiments use active RFID tags that may be read and written to by an RFID reader. While active RFID tags are not generally economically practical for the present application, advances in microelectronic fabrication and associated technologies as well as increased demand and economies of scale could see active RFID tags becoming more viable. The benefits of active RFID tags include simplified reader design, reduced reader cost and less possibility of poor coverage areas within a mini-bar on account of the tags having their own power source and thus not having insufficient power when placed in an area of insufficient energising field.

In certain embodiments, a "dry goods" tray or compartment, which houses items not requiring refrigeration such as potato crisps, chocolates, nuts and souvenir items is provided. The dry goods tray is generally in the form of a compartment with a lid and is typically located adjacent to a mini-bar. The dry goods tray has an RFID antennae and/or reader located within its enclosure, or integrated within its shelf or walls for detecting RFID tags in the tray periodically when the lid is closed. In the case of the tray not having a lid, detection may occur periodically at all times. The dry goods tray operates in a similar fashion to a mini-bar with regard to detection of items removed using the detection of RFID tags placed on the items, as described hereinbefore. Data relating to the items present or removed, and expiry dates and other details relating to such items, is communicated to the mini-bar through a wired or wireless link. The mini-bar communicates such information to the mini-bar central server, as described to hereinbefore.

Apparatuses and systems have been described hereinbefore for detecting removal of items from mini-bars and/or managing stock in mini-bars. Advantageously, apparatuses described hereinbefore can be retro-fitted to existing mini-bars. However, the foregoing description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

(Australia Only) In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. An apparatus for detecting removal of items from a mini-bar, said apparatus comprising:
   a reader for reading Radio Frequency Identification (RFID) tags attached to items in said mini-bar; and
   a processor, coupled to said reader, for identifying items removed from said mini-bar;
   wherein removal of an item from said mini-bar is detected based on absence of a RFID tag that was previously detected by said reader; and
   wherein said apparatus couples with a central computer server coupled to a Property Management System (PMS), wherein the cost of items removed from said mini-bar are debited to an associated account by said PMS.

2. The apparatus of claim 1, further comprising a detector coupled to said processor for detecting open/close status of a door of said mini-bar, wherein said RFID tags are read exclusively when said door is closed.

3. The apparatus of claim 1, wherein removal of an item is confirmed only when a RFID tag attached to said item has been absent from said mini-bar for longer than a defined time period.

4. An apparatus for detecting removal of items from a mini-bar, said apparatus comprising:
   a radio frequency detector for detecting items in said mini-bar;
   a communications interface for transmitting and receiving data;
   a memory unit for storing data and instructions to be performed by a processing unit; and
   said processing unit coupled to said detector, said communications interface and said memory unit, said processing unit programmed to:
   receive data from said radio frequency detector;
   identify items removed from said mini-bar based on said data; and
   report said removed items via said communications interface;
   wherein said apparatus, via said communications interface, couples with a central computer server coupled to a Property Management System (PMS), wherein the cost of items removed from said mini-bar are debited to an associated account by said PMS.

5. The apparatus of claim 4, wherein said radio frequency detector comprises a Radio Frequency Identification (RFID) reader for reading RFID tags attached to said mini-bar items.

6. The apparatus of claim 5, wherein said data comprises identification information relating to mini-bar items.

7. The apparatus of claim 5, further comprising a detector coupled to said processor for detecting open/close status of a door of said mini-bar, wherein said RFID tags are read exclusively when said door is closed.

8. The apparatus of claim 5, wherein removal of an item is confirmed only when a RFID tag attached to said item has been absent from said mini-bar for longer than a defined time period.

9. A mini-bar, comprising:
   a compartment for storing items;
   a reader for reading Radio Frequency Identification (RFID) tags attached to items in said compartment; and
   a processor, coupled to said reader, for identifying items removed from said compartment;
   wherein removal of an item from said compartment is identified based on absence of a RFID tag that was previously detected by said reader;
   wherein said mini-bar couples with a central computer sewer coupled to a Property Management System (PMS), wherein the cost of items removed from said compartment are debited to an associated account by said PMS.

10. The mini-bar of claim 9, wherein the mini-bar comprises a communications interface for reporting items removed from said compartment to said central computer server.

11. The mini-bar of claim 9, further comprising a display for reporting items removed from said compartment.

12. The mini-bar of claim 11, wherein the cost of items removed from said compartment is reported on said display.

13. The mini-bar of claim 9, further comprising a detector coupled to said processor for detecting open/close status of a door of said compartment, wherein said RFID tags are read exclusively when said door is closed.

14. The mini-bar of any one of claims 9, 10 or 11, wherein said processor reports removal of an identified item only when a RFID tag attached to said item has been absent from said compartment for longer than a defined time period.

15. The mini-bar of claim 9, wherein said reader comprises one or more radio frequency antennae.

16. The mini-bar of claim 15, wherein said one or more radio frequency antennae are disposed inside said compartment.

17. The mini-bar of claim 15, wherein said one or more radio frequency antennae are disposed in a door frame of said compartment.

18. The mini-bar of claim 15, wherein said one or more radio frequency antennae are disposed outside said compartment.

19. A system for managing stock in a plurality of hotel mini-bars, said system comprising:
   a central computer server;
   a plurality of Radio Frequency Identification (RFID) units coupled to said central computer server, each said RFID unit associated with one of said mini-bars;
   wherein said RFID units detect and report items removed from an associated mini-bar to said central computer server; and
   wherein said central computer server is coupled to a Property Management System (PMS), wherein the cost of items removed from said mini-bars are debited to an associated account by said PMS.

20. The system of claim 19, wherein said plurality of Radio Frequency Identification (RFID) units each comprise:
   a reader for reading Radio Frequency Identification (RFID) tags attached to items in an associated mini-bar; and
   a processor, coupled to said reader, for identifying items removed from said mini-bar;

wherein removal of an item from said mini-bar is detected based on absence of a RFID tag that was previously detected by said reader.

21. The system of claim 20, further comprising a detector coupled to said processor for detecting open/close status of a door of said mini-bar, wherein said RFID tags are read exclusively when said door is closed.

22. The system of claim 20, wherein a removed item is reported only when a RFID tag attached to said item has been absent from said mini-bar for longer than a defined time period.

23. The system of claim 19, wherein said plurality of Radio Frequency Identification (RFID) units each comprise:
 a radio frequency detector for detecting items in an associated mini-bar;
 a communications interface for transmitting and receiving data;
 a memory unit for storing data and instructions to be performed by a processing unit; and
 a processing unit coupled to said detector, said communications interface and said memory unit, said processing unit programmed to:
 receive data from said radio frequency detector;
 identify items removed from said mini-bar based on said data;
 and report said removed items via said communications interface.

24. The system of claim 23, further comprising a detector coupled to said processor for detecting open/close status of a door of said mini-bar, wherein said RFID tags are read exclusively when said door is closed.

25. The system of claim 23, wherein said processing units are programmed to report removal of an item when a RFID tag attached to said item has been absent from said mini-bar for longer than a defined time period.

26. The system of claim 19, further comprising a controller for controlling operation of at least one of said mini-bars remotely from said central computer server.

27. The system of claim 26, wherein said controller turns at least one of said mini-bars on or off in response to a command from said central computer server.

* * * * *